INVENTOR
ALBERT W. ANGELBECK
BY Donald J. Bradley
ATTORNEY

United States Patent Office 3,544,916
Patented Dec. 1, 1970

3,544,916
MULTIPLE FREQUENCY ULTRASONIC
CONTROL FOR LASERS
Albert W. Angelbeck, East Hartford, Conn., assignor to
United Aircraft Corporation, East Hartford, Conn., a
corporation of Delaware
Filed Apr. 16, 1968, Ser. No. 721,637
Int. Cl. H01s 3/00
U.S. Cl. 331—94.5
9 Claims

ABSTRACT OF THE DISCLOSURE

A laser control in which ultrasonic standing waves of different frequencies are generated within the laser medium to gate or modulate the laser at a low frequency, or to prevent amplified spontaneous emission from depopulating long laser rods during pumping.

BACKGROUND OF THE INVENTION

This invention relates to ultrasonic control of lasers by using more than one acoustical frequency. More specifically, this invention relates to the control of the output of a solid laser by the interaction of optical radiation with acoustical waves of different frequencies within the laser medium itself.

It is well known that ultrasonic standing waves may be used to gate and modulate a laser output. An ultrasonic cell in which ultrasonic waves are generated may be positioned in the path of a laser beam to modulate the laser beam, or may be inserted within the laser feedback path to modulate or Q-switch the laser output. Both refraction and diffraction effects have been used.

It is also known that an acoustic wave may be generated within the laser medium itself, thereby avoiding the introduction of lossy elements into the path of the laser or into the feedback cavity. In copending patent application Ser. No. 487,181, entitled "Laser Modulation by Focused Acoustic Energy," filed Sept. 14, 1965 by Anthony J. DeMaria, a curved ceramic transducer is bonded to a cylindrical laser rod, actuation of the transducer generating a time-varying refractive index perturbation by means of focused ultrasonic energy internal to the laser medium. And in copending application Ser. No. 521,658, entitled "Ultrasonic Modulator Having A Cylindrical Transducer," filed Jan. 19, 1966 by Herbert G. Aas and George Edward Danielson, Jr., focused acoustic energy is coupled from a cylindrical transducer into a laser rod through a fluid medium interposed between the transducer and the laser rod. This latter technique avoids problems inherent in the bonding of the transducer to the laser rod, simplifies the matching of the impedances between the transducer and the laser rod, and avoids damages to the transducer electrodes by the flash lamp and by stray laser radiation.

One of the limitations of the modulation or control of laser output using the interaction between optical radiation and acoustic waves is the lower frequency limit at which the laser may be modulated. Due to the diameter of the laser rods and the wavelengths of the acoustic waves propagated within the laser rods, the lower frequency limit for a practical sized laser rod is of the order of tens of kilocycles, i.e., a low frequency acoustic wave has a wavelength in space which is much longer than the diameter of a typical laser rod, and the generation of a low frequency acoustic wave in a laser rod will have little or no effect on the laser radiation.

In accordance with one aspect of this invention, the lower frequency limit at which modulation or gating of a laser rod may take place is extended to hundreds of cycles or lower for practical sized laser rods. Two or more standing acoustical waves, each wave being generated by its own transducer and at a different frequency, are generated within the laser rod perpendicular to the axis of the laser rod. By locating the two standing waves axially adjacent and generating each at a different frequency, a high-Q condition which allows passage of optical radiation will be produced only at a rate equal to the difference between the two acoustical frequencies. This difference or beat frequency can be selected by varying the frequencies of the two standing waves, and may be a low frequency.

Another problem which is solved by this invention is the prevention of amplified spontaneous emission which occurs during the pumping of long laser rods used as either oscillators or amplifiers. Upon pumping laser rods to their maximum inverted population, spontaneous emission takes place. In a long rod, some of this spontaneous emission produces stimulated emission during pumping, thereby causing losses and preventing a maximum population inversion. To solve this problem, most laser rods are broken into smaller individual sections, with mirrors, prisms or other optical devices positioned between adjacent rod portions to prevent the emission from propagating through the entire length of the rod and depleting the inverted population. However, the addition of optical devices causes other losses which prevent the laser from operating at its maximum efficiency.

In accordance with another aspect of this invention, sets of two standing acoustical waves are propagated internally through a long laser rod at intervals along the length of the rod and perpendicular to the axis of the laser rod. The frequency of each standing wave is slightly different from the other wave of each pair. The rod is thus Q-spoiled internally at spaced intervals, and the rod is in effect divided into several short rods with an isolator between them. The cavity will switch into a high-Q condition at a rate equal to the difference or beat frequency between the two acoustical frequencies, and may be varied by adjusting the frequencies. In this manner, oscillation and/or amplification along the entire length of the rod will be held off for several milliseconds until a maximum inverted population can be obtained. By utilizing acoustic waves internal to the laser rod, no insertion loss is introduced as would be the case with several shorter rods with isolators therebetween.

BRIEF SUMMARY OF THE INVENTION

In accordance with the preferred embodiment of this invention, a pair of cylindrical transducers are directly bonded to a laser rod, or alternatively a pair of planar transducers are positioned adjacent a laser rod and coupled to the rod through an acoustical coupling. Each transducer is driven at an ultrasonic frequency by an oscillator, the frequencies being separated by a slight amount equal to the modulation frequency desired for the laser. The transducers are positioned immediately adjacent each other.

The standing acoustical waves generated by each transducer induce changes in the index of refraction of the laser rod. The gradients in the index of refraction deflect any light traveling through the standing wave and in effect Q-spoil the laser, preventing oscillation or spontaneous emission amplification.

For each standing wave, a uniform index of refraction exists within the laser rod twice each cycle, and at this time the portion of the laser cavity in which the acoustic wave is generated has a high-Q. By locating two standing waves axially adjacent and operating each at a different frequency, the high-Q condition exists throughout the laser rod only at a rate equal to the difference or beat frequency between the two acoustical frequencies.

More than one pair of transducers may be used, and if each pair of transducers is actuated at the same frequencies as the first pair, the laser rod is effectively divided into several short rods.

It is therefore an object of this invention to provide a novel multiple frequency ultrasonic control for lasers.

Another object of this invention is a novel laser control by which a laser output may be modulated or Q-switched at a low frequency.

A further object of this invention is a novel laser control for preventing amplified spontaneous emission in a long laser rod.

Another object of this invention is a novel laser control in which pairs of ultrasonic standing waves are propagated internally in a laser rod.

DESCRIPTION OF THE PREFERRED EMBODIMENT

Figure 1:
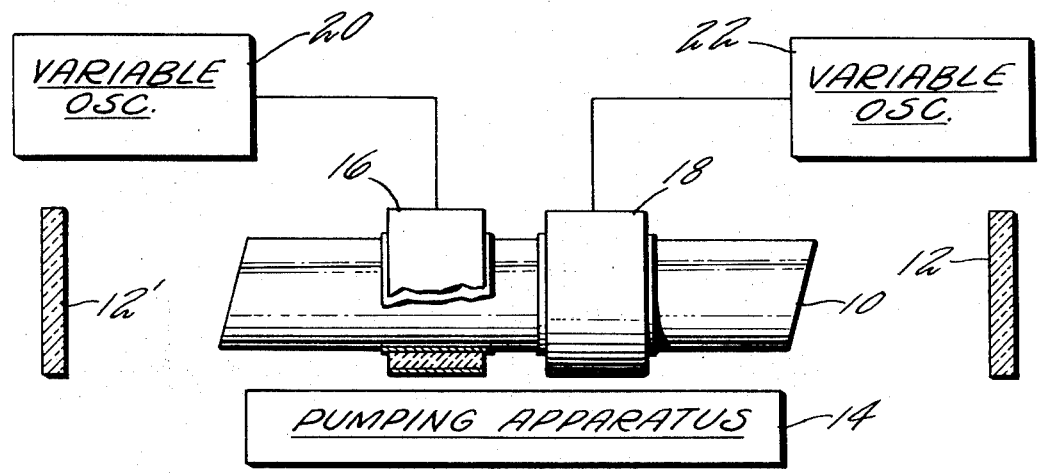
FIG. 1 is a schematic diagram of a laser control system using a pair of transducers bonded to a laser rod.

Referring to FIG. 1 there is shown a laser oscillator comprising a laser rod 10 and reflecting end mirrors 12 and 12'. The laser rod 10 may be any type of solid state laser such as ruby or YAG, or may be a liquid laser. Pumping apparatus 14 such as a flash lamp and associated power supplies provide the necessary energy for producing an inverted population in the laser rod 10.

Two transducers 16 and 18 are mechanically bonded to laser rod 10. The transducers may be tubular or cylindrical, and are preferably of a ceramic material such as $BaTiO_3$ bonded directly to the laser rod by any appropriate adhesive such as epoxy. Electrodes of thin metallic conductive elements such as foil are attached to each of the transducers about their inner and outer circumferences. One of the electrodes may be grounded, and a source of alternating voltage from oscillators 20 and 22 is applied to actuate each transducer. The transducers are preferably mounted closely together, but may be separated for certain types of operation. For additional details of the cylindrical transducers, reference may be had to copending application Ser. No. 487,181.

Alternatively the transducers may comprise ultrasonic cells of tubular cylindrical shape positioned around and concentric with the laser rod, the cells being filled with a liquid, which couples the ultrasonic energy produced by the transducer to the laser rod. Additional details of this type of transducer may be had by reference to copending application Ser. No. 521,658.

The transducers may also be flat elements, either bonded to the laser rod or coupled to the rod through a fluid. Flat transducers will generate a linear standing wave in the laser medium as opposed to the radial standing waves of cylindrical transducers.

Actuation of each transducer produces an acoustic standing wave which is focused within the laser rod 10 and perpendicular thereto, and the density variation associated therewith produces a periodic refractive index gradient fluctuation within the optical feedback path which acts as a Q-spoiler and prevents oscillation of the laser during the greater part of each acoustic cycle. Depending on the relationship of the laser beam width W to the acoustic wavelength Λ, diffraction and focusing effects may also be produced.

If the frequency of the acoustic wave generated by one of the transducers is varied to be slightly different from the frequency of the acoustic wave generated by the other transducer, a uniform index of refraction will exist in the laser rod 10 at a rate equal to the difference between the two acoustical frequencies. At this time the laser rod will be in a high-Q condition, and optical radiation will pass therethrough without appreciable loss. For example, if variable oscillator 20 actuates transducer 16 at 80 kHz., and variable oscillator 22 actuates transducer 18 at 84 kHz., a uniform index of refraction will exist in the laser rod at a frequency of 4 kHz. In this way, low frequency gating or modulation is obtained.

By varying the frequency of each or both of the transducers, the frequency of the laser output pulse train can be varied and information impressed on the pulse train. In this mode of operation, a small percentage change in the acoustical frequencies will produce a correspondingly greater percentage change in the frequency of the output pulse train.

It is apparent that more than two transducers and more than two acoustical waves may be generated within the laser rod. With more than two acoustical waves the occurrence of high-Q condition will be a more complex function of the acoustic frequencies, and in general a lower modulating frequency will be obtained.

Figure 2:
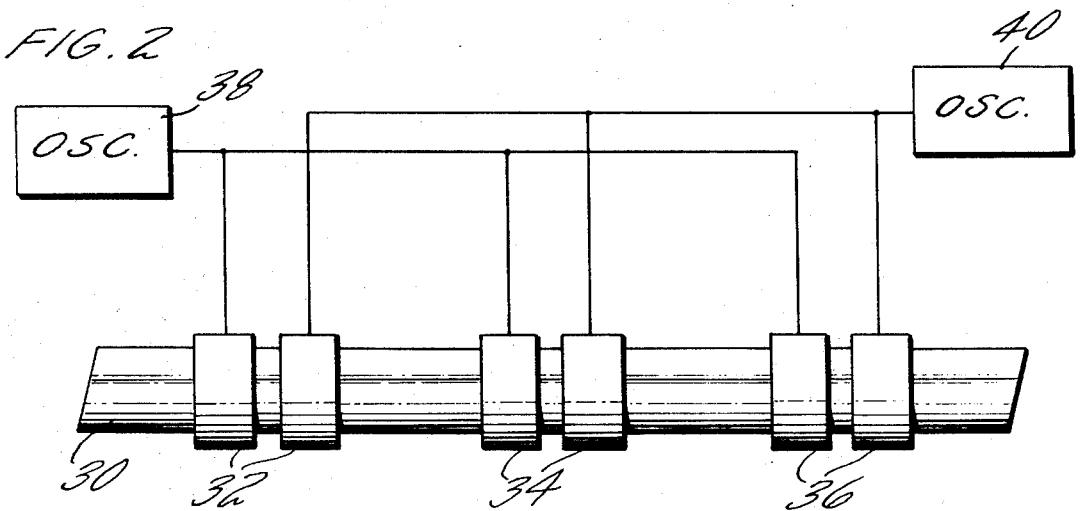
FIG. 2 is a schematic diagram of a long laser rod on which a plurality of pairs of transducers are mounted.

FIG. 2 shows a long laser rod 30 on which have been mounted pairs of transducers 32, 34 and 36 as described in conjunction with FIG. 1. Laser rod 30 is shown without feedback mirrors as an amplifier, but may be inserted into an oscillating cavity.

Amplification of spontaneous emission within long laser rods depletes the inverted population, resulting in inefficient pumping of the rod for use as an amplifier or Q-spoiled oscillator. Because of this loss mechanism during the interval when the laser rod is being pumped, the magnitude of the inverted population obtained by pumping is smaller than would be obtained if this loss mechanism was not present. By using a number of sets of two standing acoustical waves of different frequencies, oscillation and/or amplification within the laser rod may be held off for a time sufficient to build up a maximum inverted population. By Q-spoiling the laser rod internally at regular spaced intervals, the rod is in effect divided into several short rods with an isolating medium therebetween and without losses being introduced by the isolating medium.

In the preferred operation, the transducers are mounted in adjacent pairs, the spacing between pairs being determined by the amount of loss necessary per unit length of the laser rod in the low-Q condition. However, the spacing is not critical, and the transducers may be equally spaced along the laser rod. Other configurations will be apparent to those skilled in the art.

One transducer of each pair is connected to a variable oscillator 38, while the other transducer of each pair is connected to a variable oscillator 40.

The frequency of one of the oscillators is set to be slightly different from the frequency of the other oscillator so that sets of two standing acoustic waves of different frequencies are generated within the laser rod along its length.

As described in conjunction with FIG. 1, the laser rod will be maintained in a low-Q condition during the greater portion of its operation. However, at a rate determined by the difference frequency between the acoustic waves of each pair, a high-Q condition will be generated along the entire laser rod, and oscillation or amplification will take place. The frequency of the high-Q condition may be varied by adjusting the frequency difference between the transducers of each pair.

Using two acoustic standing waves of different frequencies for each isolating medium produces a gradual transition between low-Q and high-Q operation of the laser rod. By using groups of three or more different frequency standing waves, the transition between low-Q and high-Q operation is steepened, i.e., the onset of high-Q operation is more pronounced than with two acoustical frequencies.

It is apparent that each transducer may be actuated by separate oscillators, and that the frequencies of operation of each transducer may be varied individually to generate more complex control of the laser.

Although this invention has been shown and described

I claim:
1. A laser control system comprising:
a laser medium,
means for generating a first standing acoustic wave within said laser medium to intersect the optical radiation therein,
and means for generating a second standing acoustic wave within said laser medium to intersect the optical radiation therein, said second acoustic wave being at a frequency different from the frequency of said first acoustic wave, and
said laser medium being periodically modulated into a high-Q condition at a frequency equal to the difference between said first and second acoustic wave frequencies.

2. A laser control system as in claim 1 in which said means for generating said first and second acoustic waves comprise respectively first and second transducer means positioned adjacent said laser medium and in acoustical connection therewith, and
oscillator means for actuating each of said transducer means.

3. A laser control system as in claim 2 in which said first and second transducer means each comprise a curved ceramic transducer bonded to said laser medium.

4. A laser control system as in claim 2 in which said first and second transducer means each comprise a transducer positioned adjacent said laser medium, and a fluid medium interposed between said transducer and said laser medium.

5. A laser control system as in claim 2 in which said first and second transducer means comprise flat transducers.

6. A laser control system as in claim 2 in which said first and second transducer means are positioned longitudinally adjacent along the axis of said laser medium, acoustic waves intersecting said optical radiation at right angles thereto.

7. A laser control system as in claim 1 and including means for generating a plurality of pairs of acoustic waves internal to said laser medium along the axis of said laser medium, the frequency of one acoustic wave of each of said pairs being different from the frequency of the other acoustic wave of each of said pairs.

8. A laser control system as in claim 1 in which said laser medium is a crystal rod.

9. A laser control system as in claim 1 and including means for varying the frequency of each of said acoustic waves.

References Cited

UNITED STATES PATENTS

| | | | |
|---|---|---|---|
| 3,297,876 | 1/1967 | De Maria | 332—7.5X |
| 3,435,372 | 3/1969 | Aas et al. | 331—94.5 |
| 3,464,027 | 8/1969 | De Maria | 331—94.5 |

RONALD L. WIBERT Primary Examiner

P. K. GODWIN, Assistant Examiner

U.S. Cl. X.R.

250—199; 332—7.51; 350—160